US011039967B2

(12) United States Patent
 Shiga

(10) Patent No.: US 11,039,967 B2
(45) Date of Patent: Jun. 22, 2021

(54) VEHICLE

(71) Applicant: Toyota Jidosha Kabushiki Kaisha, Toyota (JP)

(72) Inventor: Kazuyuki Shiga, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 77 days.

(21) Appl. No.: 16/527,835

(22) Filed: Jul. 31, 2019

(65) Prior Publication Data

US 2020/0060903 A1 Feb. 27, 2020

(30) Foreign Application Priority Data

Aug. 22, 2018 (JP) .............................. JP2018-155313

(51) Int. Cl.
| | |
|---|---|
| *B60N 2/005* | (2006.01) |
| *B60N 2/14* | (2006.01) |
| *B60N 2/20* | (2006.01) |
| *A61G 3/08* | (2006.01) |
| *B62D 25/20* | (2006.01) |
| *B62D 31/02* | (2006.01) |

(52) U.S. Cl.
CPC .......... *A61G 3/0808* (2013.01); *B60N 2/005* (2013.01); *B60N 2/20* (2013.01); *B60N 2/14* (2013.01); *B60Y 2200/143* (2013.01); *B62D 25/20* (2013.01); *B62D 31/02* (2013.01)

(58) Field of Classification Search
CPC . B60N 2/005; B60N 2/01; B60N 2/20; B60N 2/14; B60N 2/24; B60N 2/242; B60N 2/245; B60Y 2200/143; B62D 31/02; A61G 3/08; A61G 3/0808
USPC .................................. 296/63, 69; 280/304.1
See application file for complete search history.

(56) References Cited

U.S. PATENT DOCUMENTS

| | | | | |
|---|---|---|---|---|
| 4,103,934 A | * | 8/1978 | Arnholt ................... | B60R 22/00 |
| | | | | 280/751 |
| 4,266,822 A | * | 5/1981 | Barecki .................... | A61G 3/06 |
| | | | | 105/345 |
| 4,805,954 A | * | 2/1989 | Lazaroff ............... | A61G 3/0808 |
| | | | | 280/304.1 |
| 4,971,341 A | * | 11/1990 | Magnuson ........... | A61G 3/0808 |
| | | | | 188/2 F |

(Continued)

FOREIGN PATENT DOCUMENTS

| | | |
|---|---|---|
| JP | 2013-052194 A | 3/2013 |
| JP | 2017-148445 A | 8/2017 |

*Primary Examiner* — Gregory A Blankenship
(74) *Attorney, Agent, or Firm* — Dinsmore & Shohl LLP

(57) ABSTRACT

A fixing structure 40 has an inwardly-facing seat 22, a front side seat 42, and fixing members 44. The inwardly-facing seat 22 is fixed to a floor portion 14 such that passengers PA face in a vehicle transverse direction. The front side seat 42 has a seat cushion 46 on which the passenger PA sits, and a supporting member 52, and is disposed at the floor portion 14 at a vehicle longitudinal direction front side of the inwardly-facing seat 22, and rear wheels 36 can contact the seat cushion 46 in a vehicle longitudinal direction. The supporting member 52 supports the seat cushion 46 such that the seat cushion 46 can rotate toward the inwardly-facing seat 22. The fixing members 44 fix a wheelchair 30 to the floor portion 14 in a state in which the rear wheels 36 are made to contact the front side seat 42.

8 Claims, 11 Drawing Sheets

(56) References Cited

U.S. PATENT DOCUMENTS

| | | | | |
|---|---|---|---|---|
| 5,655,816 A * | 8/1997 | Magnuson | B60N 2/0292 | 297/232 |
| 6,524,039 B1 * | 2/2003 | Magnuson | A61G 3/0808 | 410/100 |
| 7,040,847 B1 * | 5/2006 | Cardona | B60P 3/079 | 410/12 |
| 7,455,490 B1 * | 11/2008 | Goosen | A61G 3/0808 | 410/7 |
| 8,651,782 B2 * | 2/2014 | Van Roosmalen | A61G 3/08 | 410/7 |
| 2001/0001031 A1 * | 5/2001 | Craft | A61G 3/0808 | 410/7 |
| 2004/0113451 A1 * | 6/2004 | Szymanski | B60N 2/01516 | 296/65.05 |
| 2006/0159542 A1 * | 7/2006 | Ditch | A61G 3/0808 | 410/7 |
| 2008/0079252 A1 * | 4/2008 | Shutter | A61G 3/0808 | 280/755 |
| 2008/0247837 A1 * | 10/2008 | Cardona | A61G 3/0808 | 410/23 |
| 2009/0087278 A1 * | 4/2009 | Girardin | B60N 2/242 | 410/3 |
| 2014/0346825 A1 * | 11/2014 | Mill | B60N 2/242 | 297/232 |
| 2015/0164716 A1 * | 6/2015 | Kilduff | A61G 3/0808 | 410/7 |
| 2015/0224903 A1 * | 8/2015 | McDowell | B60N 2/242 | 297/183.6 |
| 2015/0328067 A1 * | 11/2015 | Girardin | B60P 3/079 | 410/7 |
| 2016/0016498 A1 * | 1/2016 | Hammarskjold | B60P 3/079 | 410/7 |
| 2016/0016499 A1 * | 1/2016 | Hammarskjold | B60P 7/0892 | |
| 2017/0008428 A1 * | 1/2017 | Mill | A61G 3/0808 | |
| 2017/0128289 A1 * | 5/2017 | Mill | B60N 2/242 | |
| 2018/0140484 A1 * | 5/2018 | Moss | B60N 2/3011 | |
| 2019/0016287 A1 * | 1/2019 | Amidon | B60P 3/03 | |
| 2019/0262198 A1 * | 8/2019 | Girardin | B60N 2/24 | |
| 2020/0039626 A1 * | 2/2020 | Johnson | B64D 11/062 | |
| 2020/0060903 A1 * | 2/2020 | Shiga | B60N 2/20 | |
| 2020/0093662 A1 * | 3/2020 | Mori | B60R 21/207 | |
| 2020/0323713 A1 * | 10/2020 | Girardin | A61G 3/0808 | |

* cited by examiner

VEHICLE

CROSS-REFERENCE TO RELATED APPLICATION

This application is based on and claims priority under 35 USC 119 from Japanese Patent Application No. 2018-155313 filed on Aug. 22, 2018, the disclosure of which is incorporated by reference herein.

BACKGROUND

Technical Field

The present disclosure relates to a vehicle.

Related Art

Japanese Patent Application Laid-Open (JP-A) No. 2017-148445 (Patent Document 1) discloses a vehicle in which a wheelchair placement region for the placement of a wheelchair is formed by flipping-up and moving a seat cushion of a passenger seat.

There are vehicles having a fixed seat in which the passengers seated therein face in the vehicle transverse direction. In such a vehicle, the seat cushion is popped-up and a space portion for placement of a wheelchair is ensured by using the structure of Patent Document 1.

Here, in a case in which a wheelchair is placed on the floor portion so as to face in the vehicle transverse direction, because the entire length of the wheelchair is longer than the vehicle transverse direction length of the seat cushion, movement of passengers in the vehicle longitudinal direction is limited by the wheelchair.

Further, in a case in, which a wheelchair is placed on the floor portion so as to face in the vehicle longitudinal direction, because there is nothing between the wheelchair and passengers who are seated in the fixed seat, there is the possibility that the wheels of the wheelchair will contact passengers who are sitting in the fixed seat. Namely, in a structure having a fixed seat that is fixed to the floor portion such that the seated passengers face in the vehicle transverse direction, there is room for improvement in boarding a passenger who is in a wheelchair into the vehicle while taking the passengers who are seated in the fixed seat into consideration.

SUMMARY

In view of the above-described circumstances, an object of the present disclosure is to provide a vehicle in which, in a structure having a fixed seat that is fixed to a floor portion such that the seated passengers face in the vehicle transverse direction a passenger who is in a wheelchair can be boarded while taking the passengers who are seated in the fixed seat into consideration.

A vehicle relating to a first aspect of the present disclosure has: a fixed seat that is fixed to a floor portion such that seated passengers face in a vehicle transverse direction; a movable seat having a seat cushion on which a passenger sits, and a supporting member that supports the seat cushion such that the seat cushion can rotate toward the fixed seat, the movable seat being disposed at the floor portion at at least one of a vehicle longitudinal direction front side or rear side with respect to the fixed seat, and wheels of a wheelchair being able to contact the seat cushion in a vehicle longitudinal direction; and a fixing member that fixes the wheelchair to the floor portion in a state in which the wheels are made to contact the movable seat.

In the vehicle relating to the first aspect, the seat cushion is rotated toward the fixed seat. Due thereto, a space portion in which a wheelchair can be placed is formed at at least one of the vehicle longitudinal direction front side and rear side with respect to the fixed seat. Here, due to wheels of the wheelchair being made to contact the seat cushion in the vehicle longitudinal direction, the passenger in the wheelchair is in a state of facing in the vehicle forward direction or the vehicle rearward direction. Further, the wheelchair is fixed to the floor portion by the fixing member in a state in which the wheels are made to contact the movable seat.

In this vehicle, because the wheelchair is placed on the floor portion so as to face in the vehicle longitudinal direction, it is difficult for movement, in the vehicle longitudinal direction, of the passengers who are seated in the fixed seat to be limited by the wheelchair. Moreover, in this vehicle, because the movable seat exists between the wheelchair and the passengers who are seated in the fixed seat, it is difficult for the wheels of the wheelchair to contact passengers who are seated in the fixed seat. Namely, a vehicle is obtained in which, in a structure having a fixed seat that is fixed to the floor portion such that the seated passengers face in the vehicle transverse direction the passenger in the wheelchair can be boarded while the passengers who are seated in the fixed seat are taken into consideration.

The movable seat of a vehicle relating to the second aspect of the present disclosure is disposed at the vehicle longitudinal direction front side with respect to the fixed seat, and the wheels are made to contact the movable seat from a vehicle front side.

In the vehicle relating to the second aspect, the wheelchair is disposed at the front side in the vehicle longitudinal direction. Moreover, the wheels of the wheelchair are made to contact the movable seat from the vehicle front side. Due thereto, the passenger in the wheelchair is in a state of facing in the vehicle forward direction at the vehicle front portion, and can see the view in the advancing direction of the vehicle. Therefore, the passenger the wheelchair can pass the time comfortably within the vehicle.

The movable seat of a vehicle relating to a third aspect of the present disclosure includes: the seat cushion; a seatback that supports the passenger from a back surface side; the supporting member that supports the seat cushion such that the seat cushion can rotate with respect to the floor portion with a vehicle transverse direction being a rotational axis direction; and a connecting member that connects the seat cushion and the seatback such that the seatback can rotate with respect to the seat cushion with the vehicle longitudinal direction being a rotational axis direction.

In the vehicle relating to the present disclosure of the third aspect, the seat cushion is supported by the supporting member so as to be able to rotate with respect to the floor portion with the vehicle transverse direction being the rotational axis direction. Moreover, the seatback is connected to the seat cushion by the connecting member. Here, due to the seatback being rotated with respect to the seat cushion with the vehicle longitudinal direction being the rotational axis direction, the seatback enters into a tided-up state and becomes integral with the seat cushion. Moreover, due to the seat cushion being rotated with respect to the floor portion with the vehicle transverse direction being the rotational axis direction, the seat cushion and the seatback are rotated integrally toward the fixed seat.

Then, in the state in which the seat cushion and the seatback have been made integral, the wheels of the wheelchair are made to contact the seat cushion. In this way, pushing force from the wheels of the wheelchair is applied to the seat cushion and the seatback that are integral. Therefore, the yield strength with respect to the pushing, force from the wheels of the wheelchair can be increased as compared with a structure in which the pushing force from the wheels of the wheelchair is resisted only by the seat cushion.

A cavity portion, and a contacting member, which can be accommodated in the cavity portion and is made to contact the floor portion n a state of being projected-out from the cavity portion toward an outer side, are provided at the seat cushion of a vehicle relating to a fourth aspect of the present disclosure.

In the vehicle relating to the fourth aspect, the contacting member, which projects-out from the cavity portion toward the outer side, contacts the floor portion. Due thereto, in addition to the supporting member, the contacting member also supports the seat cushion, and therefore, the supported state of the seat cushion can be stabilized. Moreover, when the seat cushion is rotated toward the fixed seat, the contacting member is accommodated in the cavity portion. Therefore, the contacting member docs not contact the wheels of the wheelchair, and thus, the contacting member does not affect the placement of the wheelchair. Namely, placement of the wheelchair is not affected, and the supported state of the seat cushion can be stabilized.

Groove portions, in and from which the wheels can be inserted and withdrawn in the vehicle longitudinal direction, are formed in the seat cushion of a vehicle relating to a fifth aspect of the present disclosure.

In the vehicle relating to the fifth aspect, the wheels of the wheelchair are made to enter into the groove portions along the vehicle longitudinal direction. Further, due to the wheels being made to contact the groove portions, movement of the wheels in the vehicle transverse direction is restricted. Due thereto, positional offset of the wheelchair in the vehicle transverse direction while the vehicle is traveling can be suppressed.

As described above, the present disclosure provides a vehicle in which, in a structure having a fixed seat that is fixed to a floor portion such that the seated passengers face in the vehicle transverse direction, a passenger who is in a wheelchair can be boarded while taking into consideration the passengers who are seated in the fixed seat.

Exemplary embodiments of the present disclosure will be described in detail based on the following figures, wherein.

DETAILED DESCRIPTION

A bus 10 that serves as an example of a vehicle of the present embodiment is described. Arrow FR that is shown appropriately in the respective drawings indicates the vehicle forward direction (advancing direction) of the bus 10, arrow UP indicates the vehicle upward direction of the bus 10, arrow IN indicates the vehicle transverse direction inner side of the bus 10, and arrow OUT indicates the vehicle transverse direction outer side of the bus 10. Hereinafter, when description is given merely by using longitudinal, vertical and left-right directions, they refer to the longitudinal of the vehicle longitudinal direction, the vertical of the vehicle vertical direction, and the left and the right of the vehicle transverse direction when facing in the advancing direction, unless otherwise indicated.

[Overall Structure]

Figure 2:
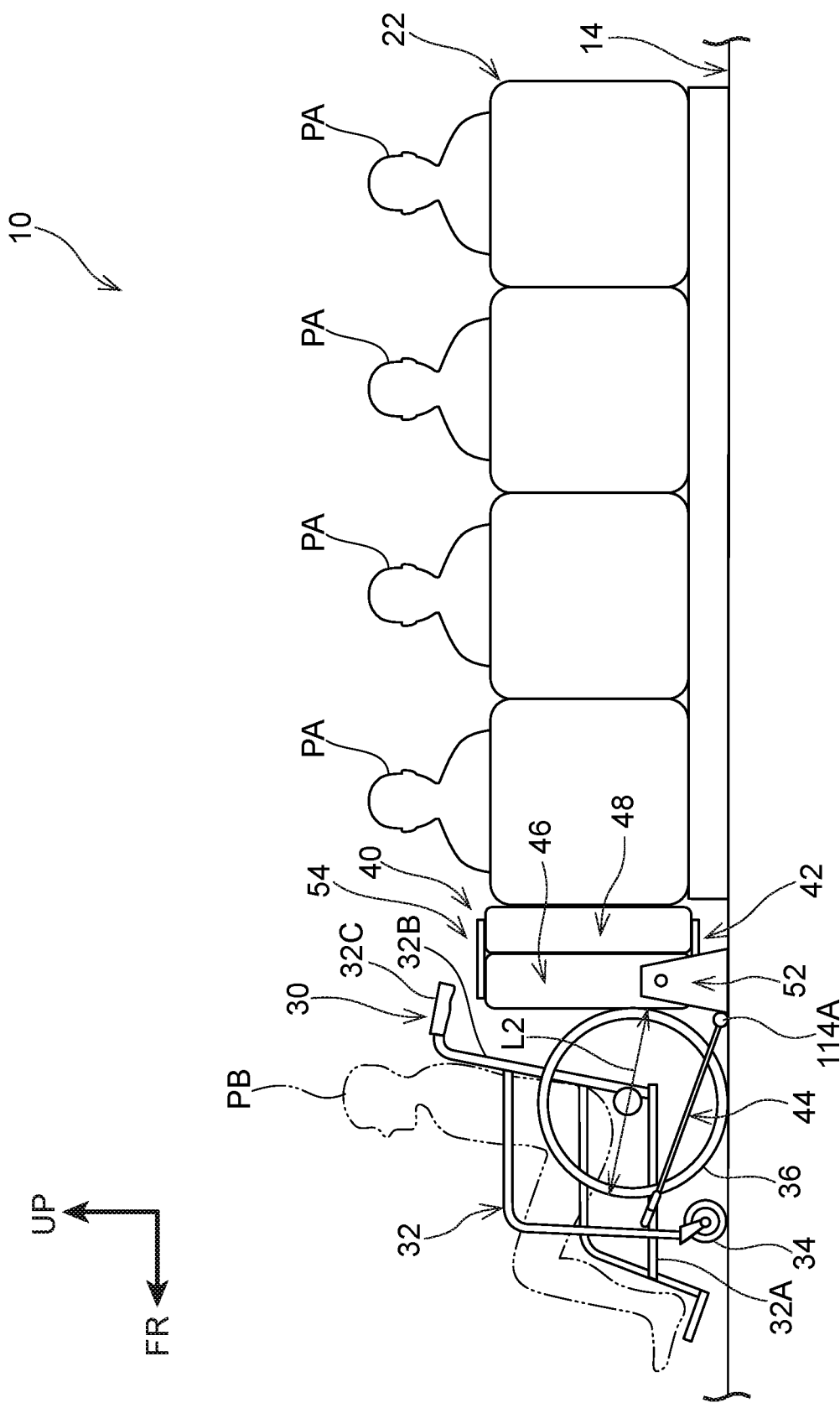
FIG. 2 is a side view showing a state in which a front side seat shown in FIG. 1 has been rotated and a wheelchair has been placed.

The bus 10 has, as the main portions thereof, an inwardly-facing seat 22, and a fixing structure 40 for fixing a wheelchair 30 (see FIG. 2). Further, the bus 10 has a vehicle body 12 and a floor portion 14, and a driver's seat 16, plural forward-facing; seats 18 and a rear portion seat 24 that are provided at the floor portion 14. The vehicle body 12 is structured to include a left side wall 26 that structures the vehicle left side portion, and a right side wall 28 that structures the vehicle right side portion. The left side wall 26 and the right side wall 28 stand upright in the vehicle vertical direction and extend along the vehicle longitudinal direction. An entrance 13 is formed in the vehicle front side of the left side wall 26. An exit 15 is formed in the vehicle rear side of the left side wall 26.

When viewed from the vehicle vertical direction, the floor portion 14 is formed substantially in the shape of a rectangle that is long in the vehicle longitudinal direction. The driver's seat 16 is disposed at the front right side of the floor portion 14. The rear portion seat 24 extends along, the vehicle transverse direction on the floor portion 14 at the rear end portion thereof. As an example, five of the forwardly-facing seats 18 are provided in the bus 10. The five forwardly-facing seats 18 are disposed along the right side wall 28 at intervals in the vehicle longitudinal direction on the floor portion 14 and between the driver's seat 16 and the rear portion seat 24.

The inwardly-facing seat 24 is an example of a fixed seat, and is fixed to the floor portion 14. The inwardly-facing seat 22 is disposed so as to be apart by length L1 in the vehicle longitudinal direction from a front side space portion 17 that faces the entrance 13 in the vehicle transverse direction at the floor portion 14. Moreover, the inwardly-facing seat 22 extends in the vehicle longitudinal direction along the left side wall 26 to a vicinity of the exit 15. As an example, the inwardly-facing seat 22 is sectioned into four seats in the vehicle longitudinal direction.

Passengers PA (see FIG. 2) who are seated in the inwardly-facing seat 22 look at the forwardly-facing seats 18. In other words, the inwardly-facing seat 22 is fixed to the floor portion 14 such that the passengers PA seated therein face in the vehicle transverse direction. Moreover, the inwardly facing seat 22 has a seat portion 22A on which the passengers PA sit, and a back portion 22B that stands upright from the vehicle transverse direction left side end portion of the seat portion 22A and that supports the passengers PA.

The space portion of the vehicle floor 14 between the front side space portion 17 and the inwardly-facing seat 22 is called wheelchair boarding space K. The size of the wheelchair boarding space K is a size that is such that the wheelchair 30 (see FIG. 2) that is described later can be placed therein along the vehicle longitudinal direction. Concretely the size (length) of the wheelchair boarding space K in the vehicle longitudinal direction is, as an example, made to be a size (length) corresponding to approximately three segments (three seats) of the inwardly-facing seat 22. Further, the size (length) of the wheelchair boarding space K in the vehicle transverse direction is, as an example, made to larger (longer) than the size (length) of the seat portion 22A in the vehicle transverse direction. Moreover, the size (height) of the wheelchair boarding space K in the vehicle vertical direction is, as an example, made to be approximately the same as the size (height) of the inwardly-facing seat 22 in the vehicle vertical direction.

<Wheelchair>

The wheelchair 30 that is shown in FIG. 2 is, as an example, structured to include a main body frame 32, front wheels 34, rear wheels 36 that serve as an example of the wheels, and an unillustrated seat member on which a passenger PB sits.

The main body frame 32 is structured to include lower frames 32A and inclined frames 32B. The lower frames 32A extend in the vehicle longitudinal direction at the vertical direction lower portion of the wheelchair 30 and at the vehicle transverse direction both side end portions of the wheelchair 30. Projecting pins 33 (see FIG. 8), which are solid cylindrical and project-out toward the vehicle upper side, are provided at portions of the lower frames 32A. The inclined frames 32B extend at upward inclines from the rear end portions of the lower frames 32A. Handle portions 32C, which are regions that are bent in L-shapes as seen from the vehicle transverse direction, are formed at the upper portions of the inclined frames 32B. When an to assistant who is other than the passenger PB is handling the wheelchair 30, the handle portions 32C are grasped by the assistant.

The front wheels 34 are provided at the front lower portions of the main body frames 32 so as to be able to rotate with the vehicle transverse direction being the rotational axis directions thereof. The rear wheels 36 are provided at the rear lower portions of the main body frames 32 so as to be able to rotate with the vehicle transverse direction being the rotational axis directions thereof. The diameter of the rear wheels 36 is larger than the diameter of the front wheels 34. Note that the length corresponding to the diameter of the rear wheels 36 is L2.

[Main Structures]

The fixing structure 40 is described next.

The fixing structure 40 that is shown in FIG. 2 has a front side seat 42 that serves as an example of the movable seat, and fixing members 44.

<Front Side Seat>

Figure 3:
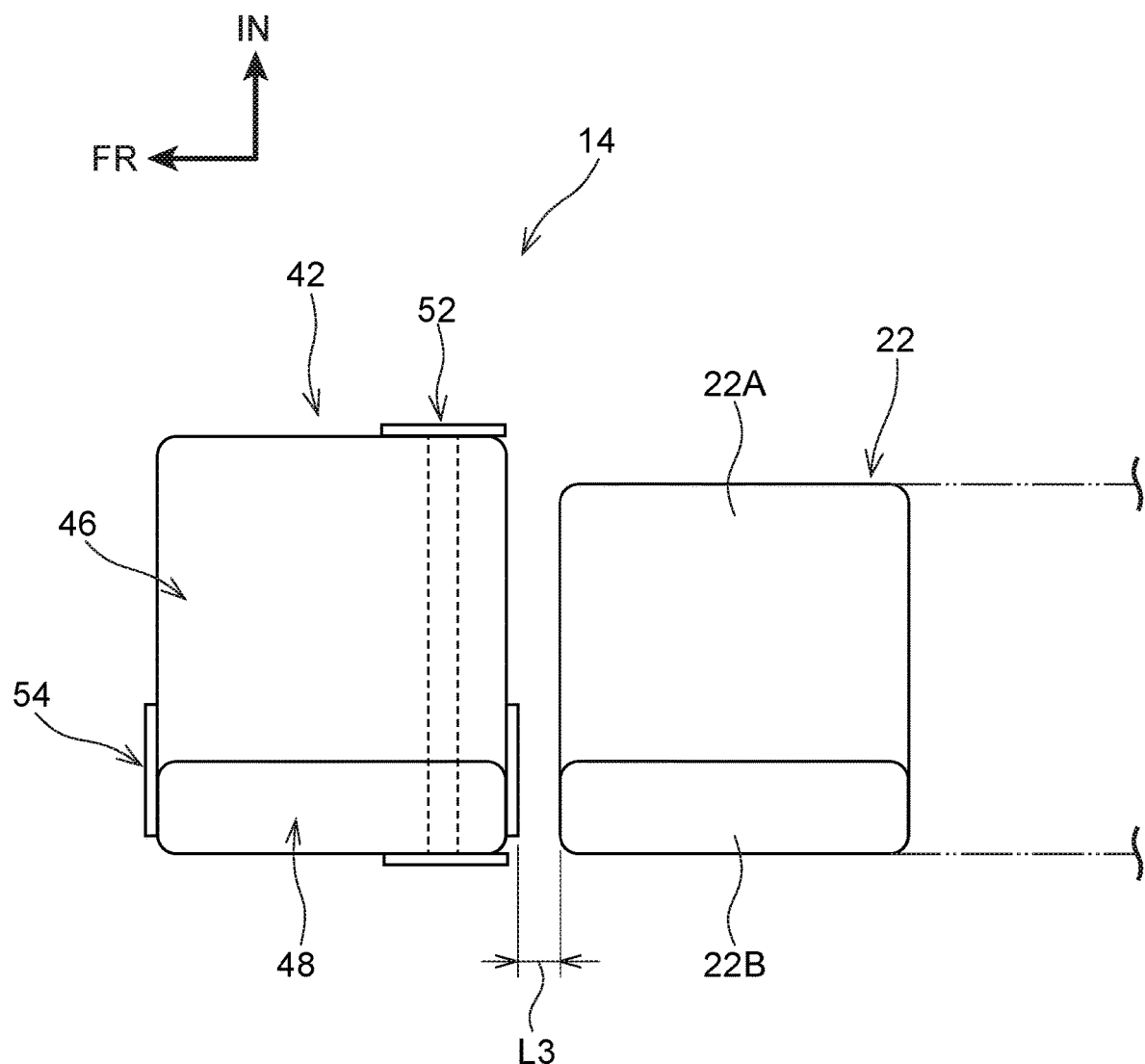
FIG. 3 is a plan view showing, in an enlarged manner, an inwardly-facing seat and the front side seat that are shown in FIG. 1.

As shown in FIG. 3, the front side seat 42 is disposed, as an example, on the floor portion 14 at the vehicle longitudinal direction front side of the inwardly-facing seat 22. The rear wheels 36 (see FIG. 2) can contact the front side seat 42 in the vehicle longitudinal direction from the vehicle front side toward the vehicle rear side. Note that the front side seat 42 is disposed so as to be apart from the inwardly-facing seat 22 by a length L3 in the vehicle longitudinal direction, so as to be able to be stored-away.

Figure 1:
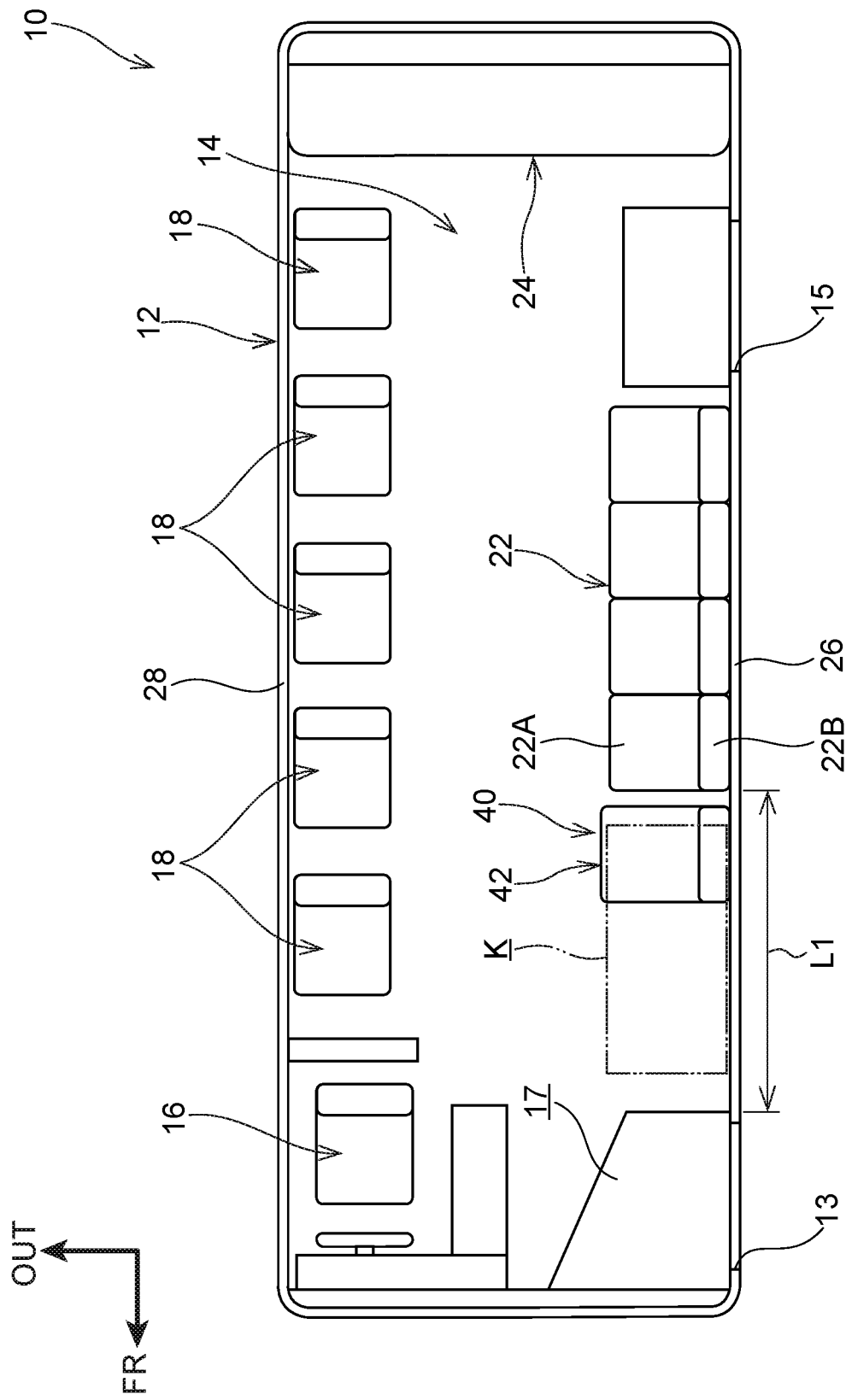
FIG. 1 is a plan view showing the interior structure of a bus relating to a present embodiment.
Figure 4:
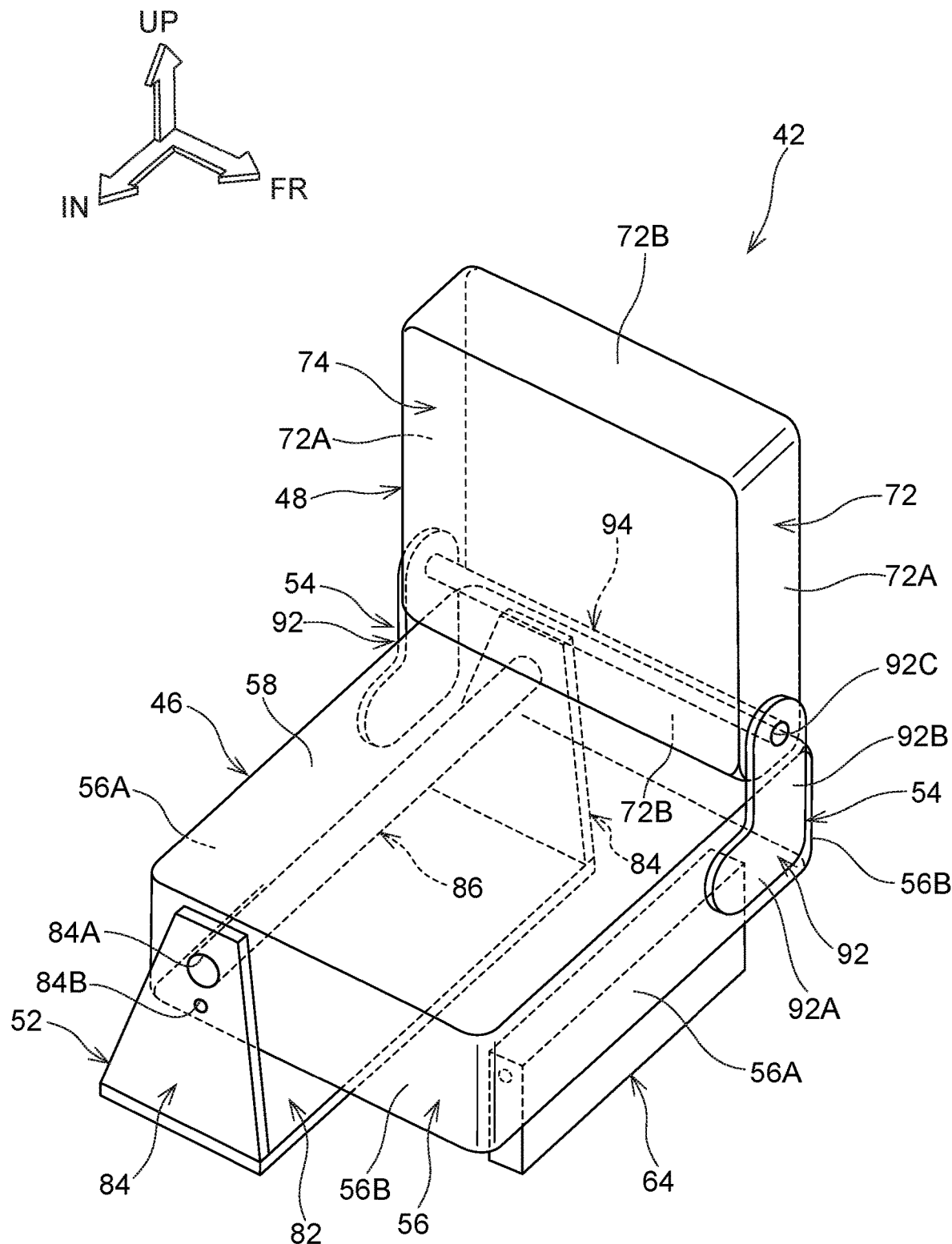
FIG. 4 is a perspective view of the front side seat shown in FIG. 1.
Figure 6:
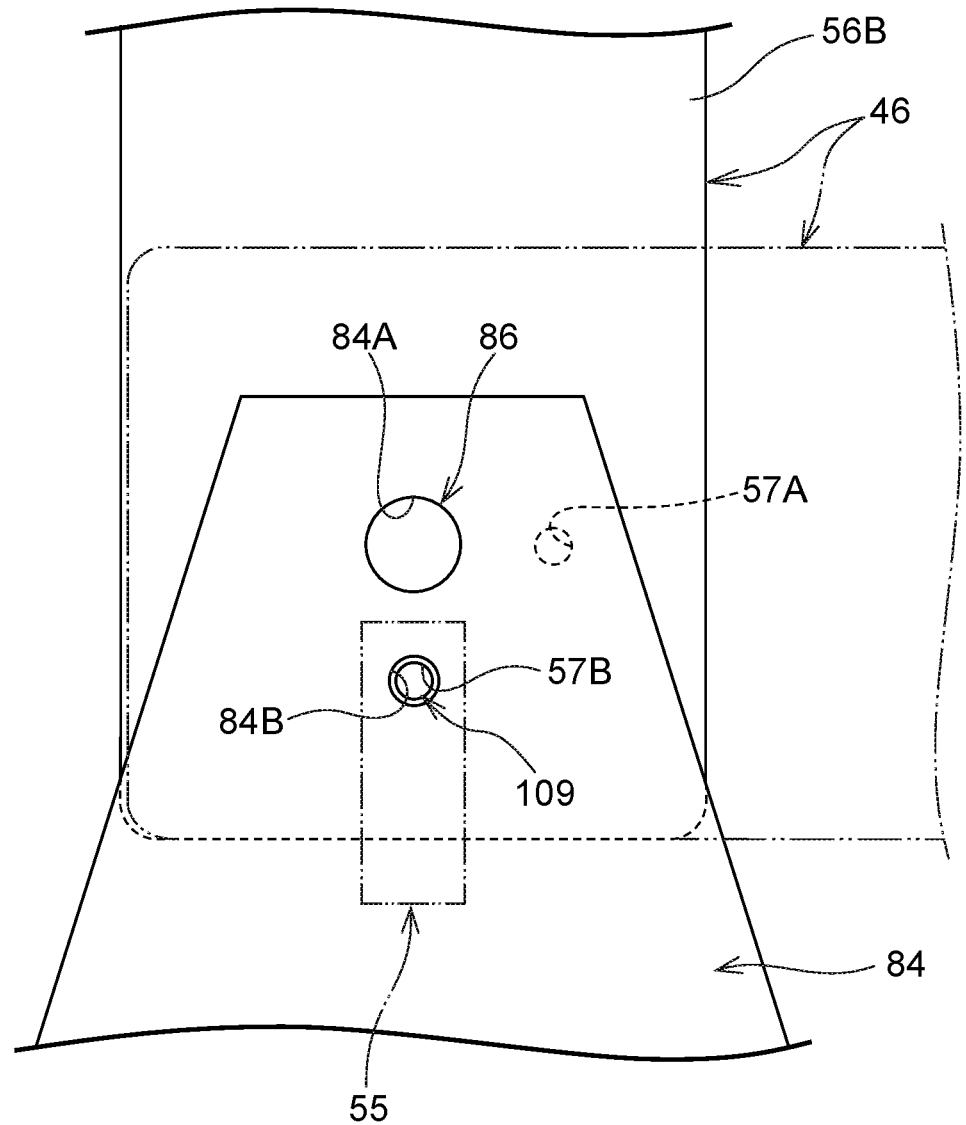
FIG. 6 is a side view showing, in an enlarged manner, a state in which the seat cushion shown in FIG. 4 has been rotated and locked.

The front side seat 42 shown in FIG. 4 has, as an example, a seat cushion 46, a seatback 48, a supporting member 52, a connecting member 54, and a locking portion 55 (see FIG. 6). Illustration of the locking portion 55 is omitted from FIG. 4. Note that, in the following description, the state in which the seat cushion 46 and the seatback 48 are unfolded such that the passenger PA (see FIG. 1) can sit therein is called the unfolded state of the front side seat 42. Further, the state in which the seat cushion 46 is stored (folded-up) so as to be able to contact the rear wheels 36 (the state shown in FIG. 2) is called the stored-away state of the front side seat 42. The unfolded state of the front side seat 42 is shown in FIG. 4.

(Seat Cushion)

As an example, the seat cushion 46 is formed in a substantially rectangular parallelepiped shape whose outer shape, as seen from the vehicle vertical direction in the unfolded state of the front side seat 42, is substantially quadrangular and whose thickness direction is the vehicle vertical direction. The seat cushion 46 structures the seating surface portion of the front side seat 42. The passenger PA (see FIG. 2) sits on the seat cushion 46.

Further, the seat cushion 46 has, as an example, a peripheral wall portion 56 that is shaped as an angular tube and structures the outer peripheral portion when seen from the vehicle vertical direction, a bottom wall 59 (see FIG. 5) that covers the vehicle vertical direction lower end of the peripheral wall, portion 56, and a cushion portion 58 that is provided at the inner side of the peripheral wall portion 56. The peripheral wall portion 56 and, the bottom wall 59 are formed of stainless steel as an example. The cushion portion 58 is structured of urethane foam and a fabric as an example.

The peripheral wall portion 56 has two side walls 56A, which face one another in the vehicle longitudinal direction and are formed in the shapes of plates that run along the vehicle transverse direction, and two side walls 56B, which face one another in the vehicle transverse direction and are formed in the shapes of plates that run along the vehicle longitudinal direction. Unillustrated through-holes, which are circular and pass-through in the vehicle transverse direction, are formed in the two side walls 56B at regions that are further toward the vehicle rear sides than the vehicle longitudinal direction centers. A supporting shaft 86 that is described later is inserted-through these through-holes.

As shown in FIG. 6, a through-hole 57A and a through-hole 57B, which are for locking the seat cushion 46 in the unfolded state or the stored-away state, are formed in the side wall 56B that is disposed at the vehicle transverse direction inner side. The through-hole 57A and the through-hole 57B are made to be the same circular shapes and have the same diameters. The through-hole 57A and the through-hole 57B are disposed so as to be offset from one another, around the through-hole that the supporting shaft 86 is inserted-through, by 90° in the peripheral direction of that through-hole (the through-hole 57A and the through-hole 578 are disposed so as to overlap if rotated 90°).

Figure 5:
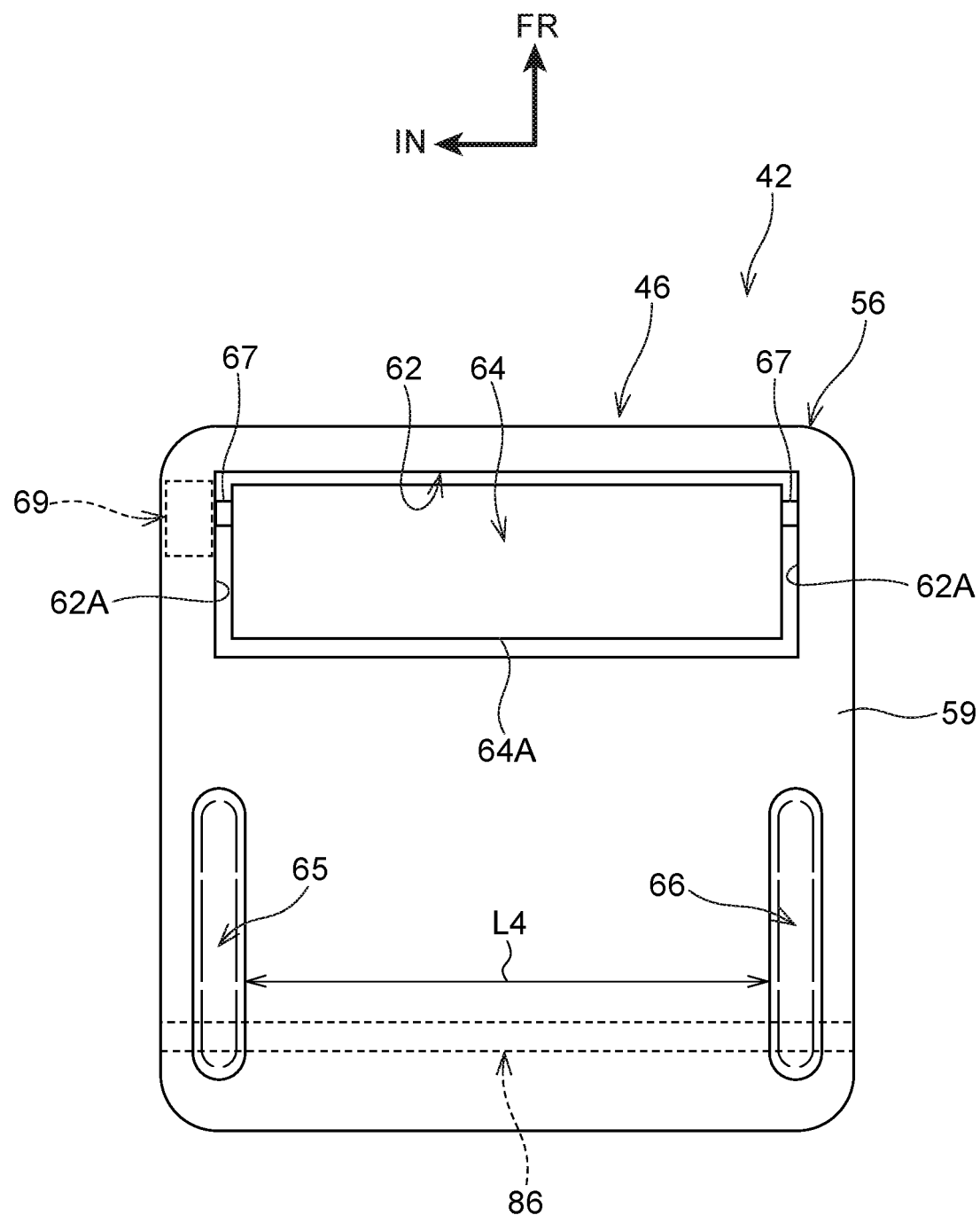
FIG. 5 is a bottom view of a seat cushion shown in FIG. 4.

A state, in which the seat cushion 46 that is in the unfolded state is seen from the lower side in the vehicle vertical direction, is illustrated in FIG. 5. As an example, a cavity portion 62, a contacting member 64, and an operation portion 69 are provided at the seat cushion 46. Further, a groove portion 65 and a groove portion 66 are formed in the seat cushion 46. In other words, the cavity portion 62 and the contacting member 64 are provided at the bottom wall 59. Further, the groove portion 65 and the groove portion 66 are formed in the bottom wall 59.

As an example, the cavity portion 62 is a region that is sunken-in toward the vehicle upper side at further toward the front side portion of the bottom wall 59 than the vehicle longitudinal direction center thereof. The cavity portion 62 is formed in a rectangular shape that is long in the vehicle transverse direction, as an example. Unillustrated concave portions, which are sunken-in toward the both outer sides in the vehicle transverse direction are formed at inner walls 62A, which face one another in the vehicle transverse direction at further toward the front side than the vehicle longitudinal direction center, of the cavity portion 62.

The contacting member 64 is structured by a plate member that is of a size that is such that it can be accommodated within the cavity portion 62. Concretely, the outer shape of the contacting member 64 as seen from the thickness direction is made to be a rectangular shape that is long in the vehicle transverse direction. Two shaft portions 67, which are solid cylindrical and project-out toward the both outer sides in the vehicle transverse direction, are formed at the vehicle transverse direction both side surfaces of the contacting member 64. The contacting member 64 is rotated relative to the bottom wall 59 due to the two shaft portions being inserted in the unillustrated concave portions of the cavity portion 62 so as to be able to rotate with the rotational axis directions thereof being the vehicle transverse direction.

In the state in which the contacting member 64 is accommodated in the cavity portion 62, a side surface 64A at the vehicle rear side of the contacting member 64 is a flat surface that runs along the vehicle transverse direction as an example. When the contacting member 64 is rotated around the shaft portions 67, the side surface 64 projects-out further toward the outer side (the vehicle lower side) than the cavity portion 62. Further, the side surface 64A contacts the top surface of the floor portion 14 (see FIG. 1) in a state of projecting-out toward the outer side from the cavity portion 62.

The operation portion 69 is provided at the seat cushion 46 at a region facing the shaft portion 67 that is at the vehicle transverse direction inner side. The operation portion 69 is structured so as to permit rotation or restrict rotation of the shaft portions 67, due to operation of an unillustrated button. In other words, in the state in which a portion of the contacting member 64 is made to project-out from the cavity portion 62 toward the vehicle lower side, and in the state in which the contacting member 64 is accommodated within the cavity portion 62, rotation of the shaft portions 67 is restricted by the operation portion 69. Further, due to the unillustrated button of the operation portion 69 being operated, rotation of the shaft portions 67 is permitted.

The groove portion 65 extends along the vehicle longitudinal direction at the bottom wall 59, as an example, at a region that is further toward the rear side than the vehicle longitudinal direction center and at a region that is further toward the inner side than the vehicle transverse direction center. Further, the groove portion 65 is a region that is sunken-in toward the vehicle upper side. The vehicle transverse direction length of the groove portion 65 is longer than the vehicle transverse direction length of the rear wheel 36 (see FIG. 2). Namely, entry and exit (insertion, and withdrawal) of the rear wheel 36 in the vehicle longitudinal direction into and out of the groove portion 65 is possible. Moreover, the vehicle longitudinal direction length of the groove portion 65 is made to be a length that is about ⅓ of the aforementioned length L2. (see FIG. 2) as an example.

The groove portion 66 extends along the vehicle longitudinal direction at the bottom wall 59, as an example, at a region that is further toward the rear side than the vehicle longitudinal direction center and at a region that is further toward the outer side than the vehicle transverse direction center. Further, the groove portion 66 is a region that is sunken-in toward the vehicle upper side. The vehicle transverse direction length and the vehicle longitudinal direction length of the groove portion 66 are the same as the lengths of the groove portion 65. Namely, entry and exit of the rear wheel 36 in the vehicle longitudinal direction into and out of the groove portion 66 is possible.

Length L4, which corresponds to the interval in the vehicle transverse direction between the groove portion 65 and the groove portion 66, is approximately the same as a length corresponding to the interval in the vehicle transverse direction between the two rear wheels 36. In the stored-away state of the front side seat 42, the groove portion 65 and the groove portion 66 can contact the rear wheels 36 in the vehicle longitudinal direction.

(Seatback)

As an example, the seatback 48 that is shown in FIG. 4 is formed in a substantially rectangular parallelepiped shape whose outer shape, as seen, from the vehicle transverse direction in the unfolded state of the front side seat 42, is substantially quadrangular and whose thickness direction is the vehicle transverse direction. The seatback 48 structures the backrest portion of the front side seat 42. The seatback 48 supports the passenger PA (see FIG. 2) from the back surface side.

Further, as an example, the seatback 48 has a peripheral wall portion 72 that is shaped as an angular tube and structures the outer peripheral portion when seen from the vehicle transverse direction, and a cushion portion 74 that is provided at the inner side of the peripheral wall portion 72. The peripheral wall portion 72 is formed of stainless steel as an example. The cushion portion 74 is structured of urethane foam and a fabric as an example.

The peripheral wall portion 72 has two side walls 72A, which face one another in the vehicle longitudinal direction and are formed in the shapes of plates that run alone the vehicle vertical direction, and two side walls 72B, which face one another in the vehicle vertical direction and are formed in the shapes of plates that run along the vehicle longitudinal direction. Unillustrated through-holes, which respectively are circular and pass-through in the vehicle longitudinal direction, are formed in the two side walls 72A at regions that are further toward the lower side than the vehicle vertical direction centers. A connecting rod 94 that is described later is inserted-through these through-holes.

(Supporting Member)

The supporting member 52 that is shown in FIG. 4 has, an example, a single bottom plate 82, two side plates 84, and the single supporting shaft 86. The bottom plate 82 is fixed to the floor portion 14 (see FIG. 1) by using unillustrated screws and with the vehicle vertical direction being the plate thickness direction thereof. The outer shape of the bottom plate 82 is a rectangular shape that is long in the vehicle transverse direction, as seen from the vehicle vertical direction. The vehicle transverse direction length of the bottom plate 82 is longer than the vehicle transverse direction length of the seat cushion 46.

The two side plates 84 stand erect along the vehicle vertical, direction at the vehicle transverse direction both end portions of the bottom plate 82. The length, that corresponds to the interval in the vehicle transverse direction between the two side plates 84, is longer than the vehicle transverse direction length of the seat cushion 46. Further, the outer shapes of the two side plates 84 are, as an example, isosceles trapezoidal when seen from the vehicle transverse direction. Moreover, through-holes 84A, which are circular and pass-through in the vehicle transverse direction, are formed in the upper portions of the two side plates 84. Through-holes 84B which are circular and pass-through in the vehicle transverse direction, are formed in the two side plates 84 at the lower sides of the through-holes 84A. The diameter of the through-holes 84B is smaller than the diameter of the through-holes 84A. The through-holes 84B are formed so as to, when the seat cushion 46 is rotated, communicate with ones of the through-holes 57A and the through-holes 57B (see FIG. 6) in the vehicle transverse direction.

The supporting shaft 86 is formed in a solid cylindrical shape. The axial direction length of the supporting shaft 86 is longer than the length corresponding to the interval in the vehicle transverse direction between the two side plates 84. Further, the supporting shaft 86 is inserted-through the unillustrated through-holes of the two side walls 56B and the through-holes 84A of the two side plates 84, with the vehicle transverse direction being the axial direction. In this inserted-through state, unillustrated pull-out preventing members are provided at the axial direction both end portions of the supporting shaft 86. Due thereto, the supporting shaft 86 is supported by the two side plates 84. Further, the seat cushion 46 can rotate (pivot) around the supporting shaft 86 in the peripheral direction of the supporting shaft 86. In other words, the supporting member 52 supports the seat cushion 46 such that the seat cushion 46 can rotate with respect to the floor portion 14 (see FIG. 1) and with the vehicle transverse direction being the rotational axis direction. Further, the supporting member 52 supports the seat cushion 46 such that the seat cushion 46 can rotate toward the inwardly-facing seat 22 (see FIG. 1).

(Connecting Member)

The connecting member 54 has two side plates 92 and the single connecting rod 94, as an example.

The outer shapes of the two side plates 92 are, as an example, L-shaped when seen from the vehicle longitudinal direction which is the thickness direction thereof. Concretely, the side plate 92 has a horizontal portion 92A that extends in the vehicle transverse direction, and a vertical portion 92B that extends toward the vehicle upper side from the vehicle transverse direction outer side end portion of the horizontal portion 92A. The two horizontal portions 92A are fixed one each to the vehicle transverse direction outer side portions of the two side walls 56A by using unillustrated screws. Through-holes 92C, which are circular and pass-through the side plates 92 in the vehicle longitudinal direction, are formed in the upper portions of the vertical portions 92B.

The connecting rod 94 is formed in a solid cylindrical shape. The axial direction length of the connecting rod 94 is longer than the length corresponding to the interval in the vehicle transverse direction between the two side plates 92. The connecting rod 94 is inserted-through the through-holes 92C and the unillustrated through-holes of the side walls 72A with the vehicle longitudinal direction being the axial direction thereof. In this inserted-through state, unillustrated pull-out preventing members are provided at the axial direction both end portions of the connecting rod 94. Due thereto, the connecting rod 94 is supported by the two side plates 92. Further, the seatback 48 can rotate (pivot) around the connecting rod 94 in the peripheral direction of the connecting rod 94. In other words, the connecting member 54 connects the seat cushion 46 and the seatback 48 such that the seatback 48 can rotate with respect to the seat cushion 46 and with the vehicle longitudinal direction being the rotational axis direction.

(Locking Portion)

As shown in FIG. 6, the locking portion 55 is provided at the side plate 84 that is at the vehicle transverse direction inner side, so as to overlap the through-hole 84B in the vehicle transverse direction.

Figure 7:
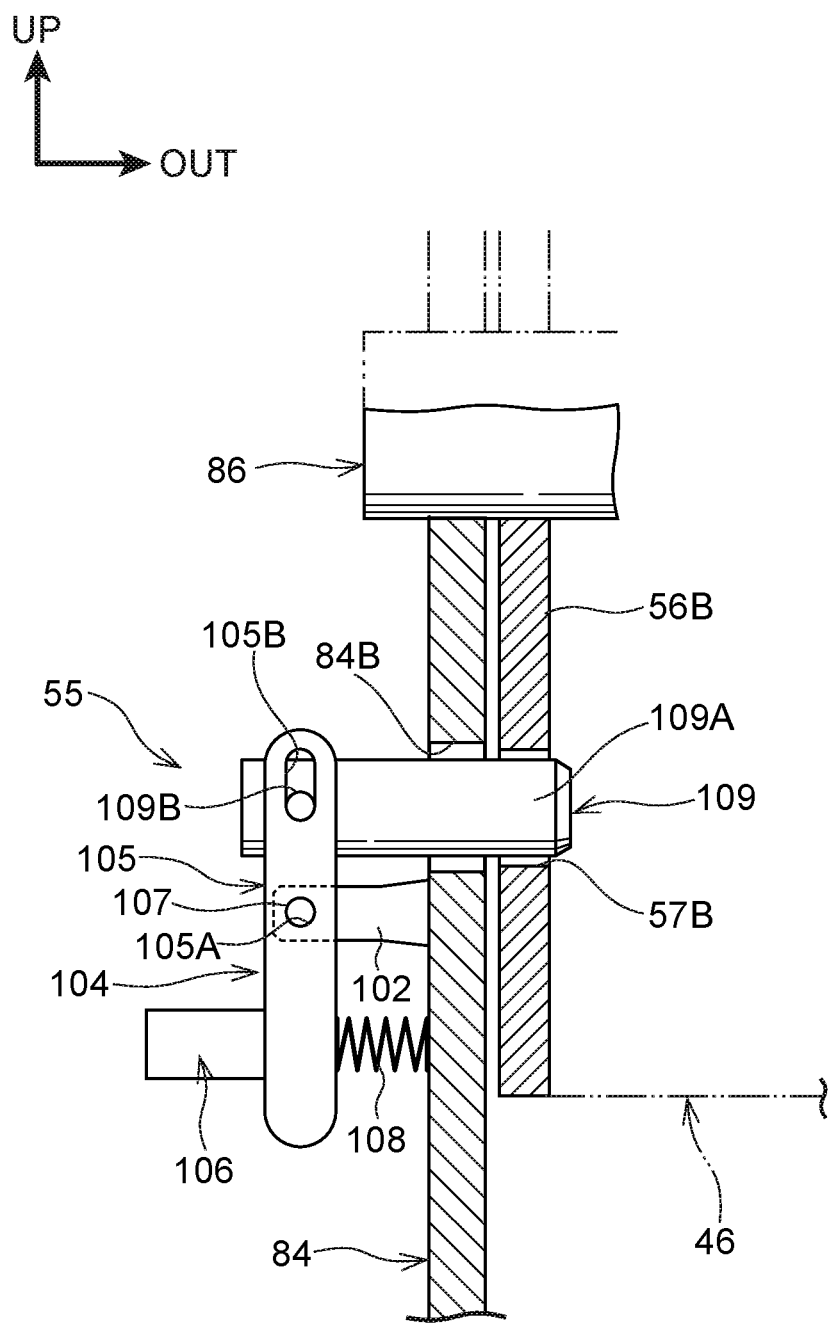
FIG. 7 is a vertical sectional view showing, in an enlarged manner, the structure of a locking portion shown in FIG. 6.

As shown in FIG. 7, as an example, the locking portion 55 has a supporting pillar 102, an operation lever 104, a coil spring 108 that is an urging member, and a lock pin 109. The supporting pillar 102 is fixed to the side plate 84 that is at the vehicle transverse direction inner side, and extends with the axial direction thereof being the vehicle transverse direction. An unillustrated through-hole that passes-through in the vehicle longitudinal direction is formed in the supporting pillar 102. The operation lever 104 has a link portion 105 that is long in one direction, and an operation portion 106 that is pillar-shaped and is provided at a length direction one end portion of the link portion 105.

A through-hole 105A, which communicates with the through-hole of the supporting pillar 102, is formed in the length direction central portion of the link portion 105. Further, a long hole 105B is formed at the side, which is opposite the operation portion 106 side in the length direction, of the link portion 105. The central portion of the link portion 105 is connected to the supporting pillar 102 by a connecting pin 107 that is inserted-through the through-hole 105A and the through-hole of the supporting pillar 102. In other words, the one end portion and the another end portion of the operation lever 104 can swing in the vehicle transverse direction around the connecting pin 107. The coil spring 108 is interposed between the side plate 84 and the operation portion 106 side region of the link portion 105, with the vehicle transverse direction being the direction of elastic deformation thereof.

The lock pin 109 has a main body portion 109A, which is shaped as a solid cylinder and whose axial direction is the vehicle transverse direction, and a projecting portion 109B that is shaped as a solid cylinder and projects-out toward the radial direction outer side from the outer peripheral surface of the vehicle transverse direction inner side end portion of the main body portion 109A. As an example, the main body portion 109A is inserted-through the through-hole 57B and the through hole 84B in the stored-away state of the front side seat 42. The projecting portion 109B is inserted-through the long hole 105B. Here, in a case in which the operation portion 106 is moved to the vehicle transverse direction outer side, the coil spring 108 is compressed, and the main body portion 109A comes or from the through-hole 57B. On the other hand, in a case in which the operation portion 106 is moved to the vehicle transverse direction inner side, the coil spring 108 is extended, and the main body portion 109A is inserted-through the through-hole 57B. Note that, in the unfolded state of the front side seat 42 (see FIG. 4), the main body portion 109A is inserted-through the through-hole 57A (see FIG. 6) and the through-hole 84B. In this way, the locking portion 55 locks the front side seat 42 with respect to the side plate 84 in the stored-away state and in the unfolded state.

<Fixing Members>

Figure 8:
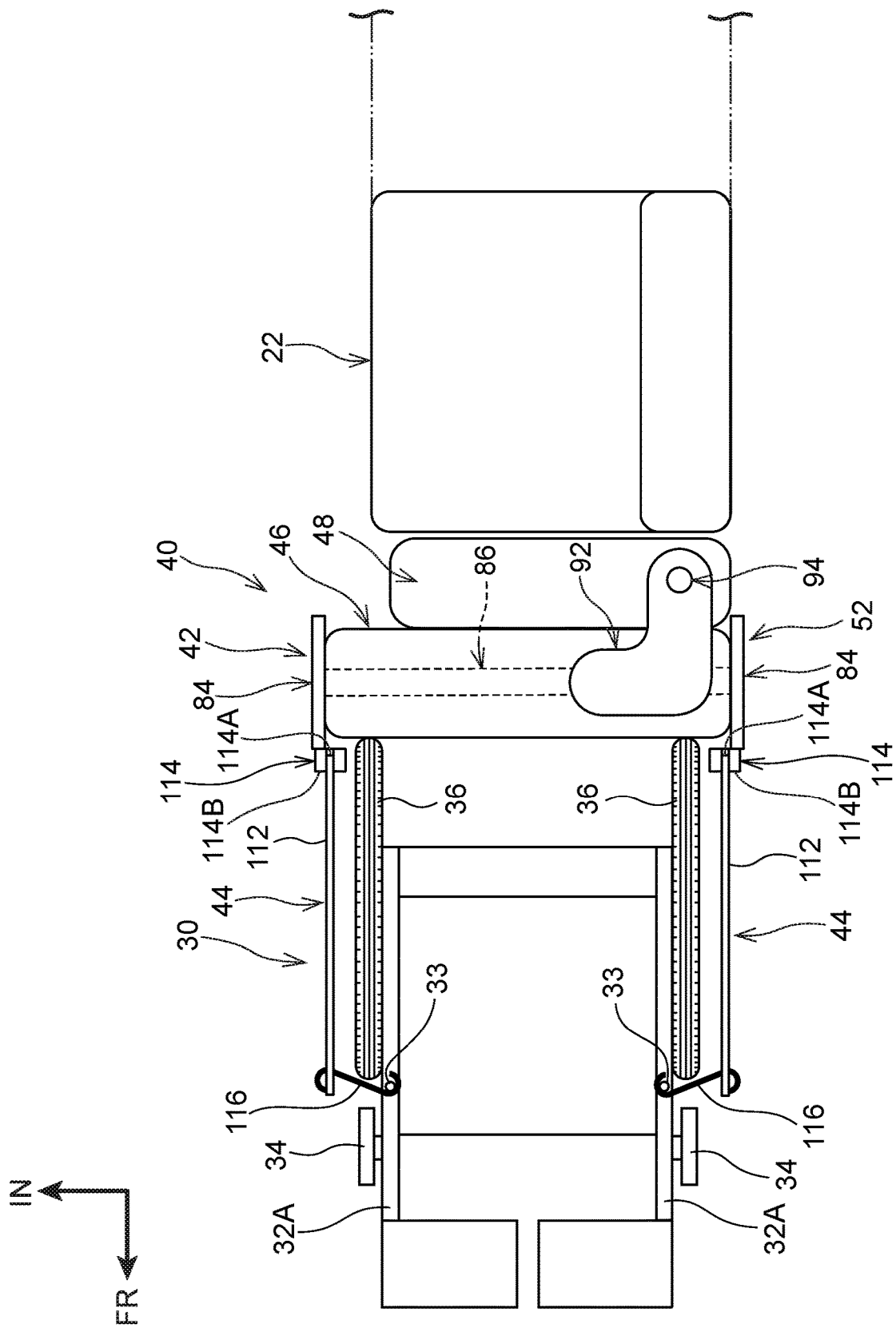
FIG. 8 is a plan view showing the inwardly-facing seat, the front side seat and the wheelchair that are shown in FIG. 2.

Each of the two fixing members 44 that are shown in FIG. 8 has a belt portion 112, a mounting portion 114, and a hook portion 116. As an example, the fixing members 44 are disposed one at each of the vehicle transverse direction one side and another side with respect to the wheelchair 30 that is in a state of contacting the front side seat 42. Note that the belt portions 112 and the hook portions 116 can be stored at the lower side of the front side seat 42 in the unfolded state of the front side seat 42.

The belt portion 112 is formed in the shape of a rectangular plate that is long in one direction, and is flexible in that one direction. The mounting portion 114 is structured by a ring member 114A, which is provided at one end portion of the belt portion 112, and a mounting hardware 114B that, is plate-shaped. The mounting hardware 114B is adjacent to the side plate 84, and is mounted to the floor portion 14 by an unillustrated screw. The position of the ring member 114A can be changed relative to the mounting, hardware 114B. The hook portion 116 is structured by an S-shaped hook member as an example. A portion of the hook portion 116 is attached to the another end portion of the belt portion 112. Further, the hook portion 116 catches on the projecting pin 33 of the wheelchair 30.

Here, in the state in which the rear wheels 36 are made to contact the front side seat 42, the belt portions 112 of the two fixing members 44 are stretched toward the projecting pins 33, and the hook portions 116 are made to catch on the projecting pins 33. Due thereto, the fixing members 44 fix the wheelchair 30 to the floor portion 14.

[Operation and Effects]

Operation and effects of the fixing structure 40 of the present embodiment are described next. Note that it is assumed that the wheelchair 30 (see FIG. 2) is moving together with the passenger PB on the floor portion 14 of the bus 10 shown in FIG. 1.

At the fixing structure 40 that is shown in FIG. 7, the locking portion 55 is operated in a case in which the state of the front side seat 42 is changed from the unfolded state to the stored-away state. Concretely, due to the operation portion 106 being moved to the vehicle transverse direction outer side, the coil spring 108 is compressed, and the main body portion 109A comes-out from the through-hole 57B. Due thereto, the seat cushion 46 becomes able to rotate.

Figure 9:
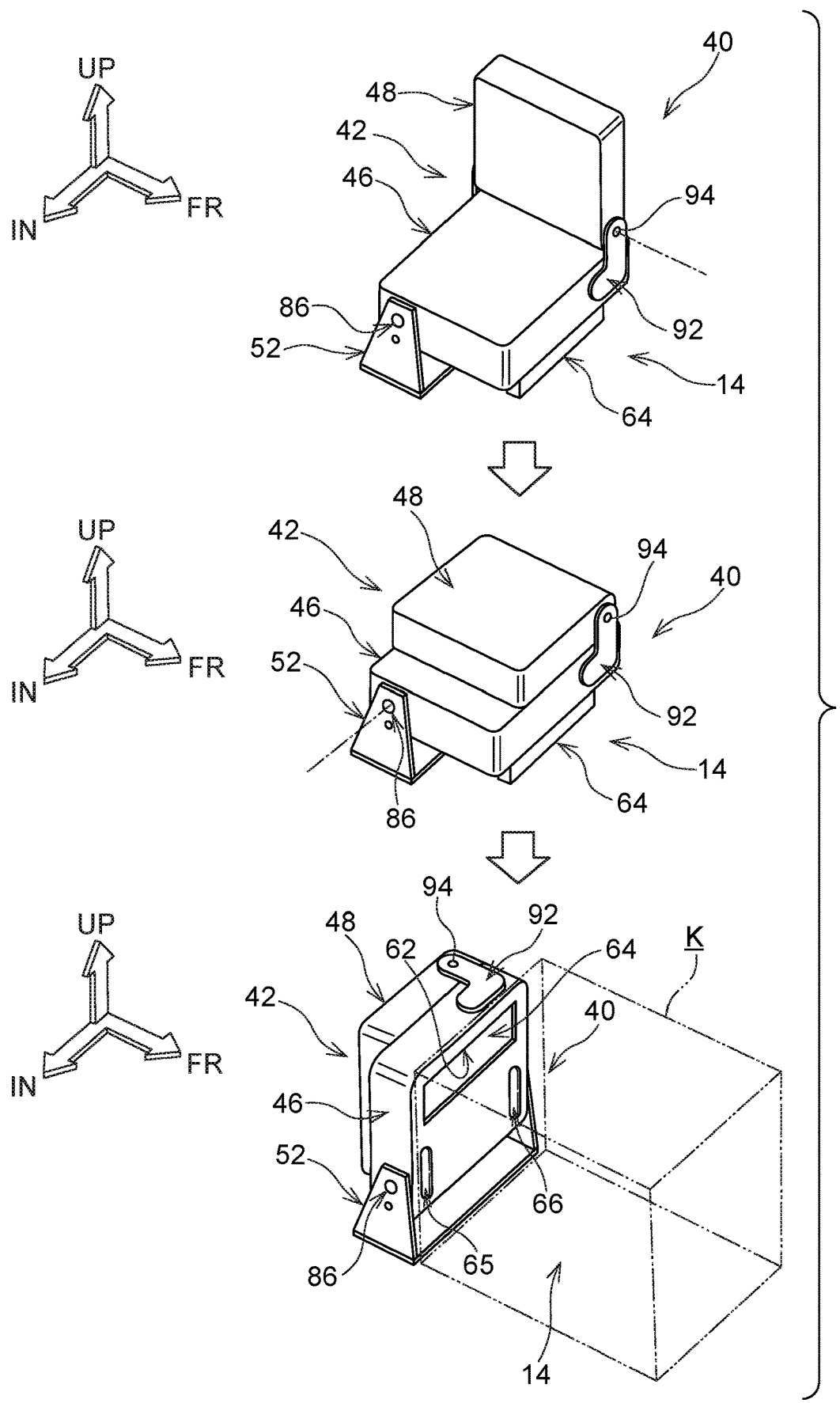
FIG. 9 is a process drawing showing, in steps, rotation of a seatback and rotation of the seat cushion that are shown in FIG. 4.

As shown in FIG. 9, at the fixing structure 40, due to the seatback 48 being rotated (pivoted) toward the vehicle transverse direction inner side around the connecting rod 94, the seatback 48 is set in a folded-up state in which it contacts the seat cushion 46. Note that illustration of the locking portion 55 is omitted from FIG. 9.

Next, the seat cushion 46 and the seatback 48 that are in the folded-up state that are integral) are rotated (pivoted) toward the vehicle rear side around the supporting shaft 86. At this time, due to the operation portion 69 (see FIG. 5) being operated, the contacting member 64 is accommodated within the cavity portion 62. Then, in the state in which the seat cushion 46 is upright along the vehicle vertical direction, due to the main body portion 109A (see FIG. 7) being inserted-through the through-hole 57B (see FIG. 7), the seat cushion 46 is locked (held). In this way, the wheelchair boarding space K is formed at the vehicle front side of the front side seat 42 that is in an stored-away state. The groove portion 65 and the groove portion 66 are in states of being disposed so as to face the wheelchair boarding space K.

Figure 10:
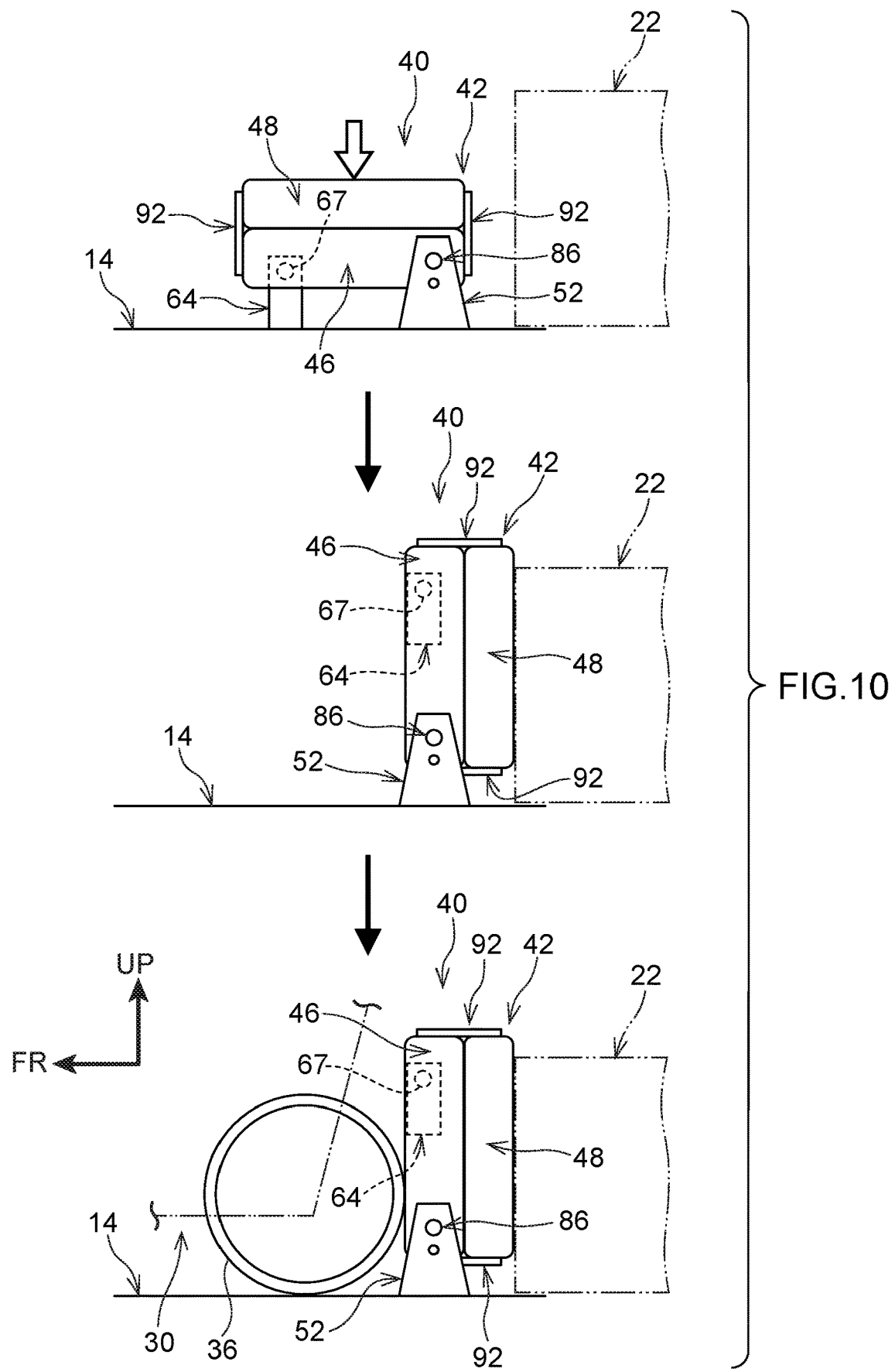
FIG. 10 is a process drawing showing, in steps, states in which the seatback and the seat cushion that are shown in FIG. 4 are rotated, and wheels of the wheelchair are made to contact the seat cushion.

As shown in FIG. 10, in the stored-away state of the front side seat 42, the front side seat 42 is disposed so as to be adjacent to the inwardly-facing seat 22. Then, the wheelchair 30 is moved from the vehicle front side with respect to the front side seat 42. At this time, the rear wheels 36 are made to contact the groove portion 65 and the groove portion 66 (see FIG. 9) while being inserted therein.

In the state in which the rear wheels 36 that are shown in FIG. 8, and the groove portion 65 and the groove portion 66 (see FIG. 9), contact one another, the belt portions 112 are stretched, and the hook portions 116 are made to catch on the projecting pins 33. The wheelchair 30 is pushed toward the front side seat 42 due to the tensile forces of the belt portions 112 being applied. In this way, the wheelchair 30 is fixed with respect to the floor portion 14.

As described above, in the fixing structure 40, the seat cushion 46 is rotated toward the inwardly-facing seat 22. Due thereto, the wheelchair boarding space K (see FIG. 9) in which the wheelchair 30 can be placed is formed at the front side of the inwardly-facing seat 72.

As shown in FIG. 2, due to the rear wheels 36 being made to contact the seat cushion 46 in the vehicle longitudinal direction, the passenger PB is in a state of facing in the vehicle forward direction. Further, in the state in which the rear wheels 36 are made to contact the front side seat 42, the wheelchair 30 is fixed to the floor portion 14 by the fixing members 44. Here, in the bus 10, the wheelchair 30 is placed on the floor portion 14 so as to face in the vehicle longitudinal direction. Therefore, the interval in the vehicle transverse direction between the wheelchair 30 and the forwardly-facing seats 18 (see FIG. 1) is wide as compared with a case in which the wheelchair 30 is placed so as to face in the vehicle transverse direction. Due thereto, it is difficult for movement of the passengers PA in the vehicle longitudinal direction to be limited by the wheelchair 30.

Moreover, in the bus 10, the front side seat 42 exists between the wheelchair 30 and the passengers PA who are seated in the inwardly-facing seat 22. Therefore, it is difficult for the rear wheels 36 to contact the passenger PA who is seated at the front end side of the inwardly-facing seat 22. Namely, in the bus 10 that has the inwardly-facing seat 22 that is fixed to the floor portion 14 such that the seated passengers PA face in the vehicle transverse direction, the passenger PB in the wheelchair 30 can be boarded onto the bus 10, while the passengers PA who are seated in the inwardly-facing seat 22 are taken into consideration.

At the fixing structure 40, the wheelchair 30 is disposed at the vehicle front side of the inwardly-facing seat 22. Moreover, the rear wheels 36 are made to contact the front side seat 42 from the vehicle front side toward the vehicle rear side. Due thereto, the passenger PB in the wheelchair 30 is in a state of facing in the vehicle forward direction at the vehicle front portion, and can see the view in the advancing direction of the bus 10. Therefore, the passenger PB in the wheelchair 30 can pass the time comfortably within the bus 10.

Moreover, at the fixing structure 40, the seat cushion 46 is supported by the supporting member 52 so as to be able to rotate with respect to the floor portion 14 and with the vehicle transverse direction being the rotational axis direction. Moreover, the seatback 48 is connected to the seat cushion 46 by the connecting member 54. Here, due to the seatback 48 being rotated with respect to the seat cushion 46 and with the vehicle longitudinal direction being the rotational axis direction, the seatback 48 is set in a folded-up state and is made integral with the seat cushion 46. Moreover, due to the seat cushion 46 being rotated with respect to the floor portion 14 and with the vehicle transverse direction being the rotational axis direction, the seat cushion 46 and the seatback 48 are rotated integrally toward the inwardly-facing seat 22.

The rear wheels 36 are made to contact the seat cushion 46 in the state in which the seat cushion 46 and the seatback 48 are made integral. In this way, pushing force from the rear wheels 36 is applied to the seat, cushion 46 and the seatback 48 that are integral. Therefore, the yield strength with respect to the pushing force from the rear wheels 36 can be increased as compared with a structure in which the pushing force from the rear wheels 36 is resisted only by the seat cushion 46.

In addition, at the fixing structure 40 shown in FIG. 9, in a case in which the front side seat 42 is set in the unfolded state, the contacting member 64 that projects-out toward the outer side from the cavity portion 62 is made to contact the floor portion 14. Due thereto, in addition to the supporting member 52, the contacting member 64 also supports the seat cushion 46, and therefore, the supported state of the seat cushion 46 can be stabilized. Moreover, when the seat cushion 46 is rotated toward the inwardly-facing seat 22, the contacting member 64 is accommodated in the cavity portion 62. Therefore, the contacting member 64 does not contact the rear wheels 36 (see FIG. 2), and thus, the contacting member 64 does not affect the placement of the wheelchair 30. Namely, the placement of the wheelchair 30 is not affected, and the supported state of the seat cushion 46 can be stabilized.

Further, in the fixing structure 40, the rear wheels 36 (see FIG. 2) are made to enter into the groove portion 65 and the groove portion 66 along the vehicle longitudinal direction. Due to the rear wheels 36 being made to contact the groove portion 65 and the groove portion 66, movement of the rear wheels 36 in the vehicle transverse direction is restricted. Due thereto, positional offset of the wheelchair 30 (see FIG. 2) in the vehicle transverse direction while the bus 10 is traveling can be suppressed.

Moreover, the locking portion 55 (see FIG. 6), which locks the front side seat 42 in the folded-up state (the stored-away state) and in the unfolded state, is provided, at the fixing structure shown in FIG. 2. Due thereto, in the stored-away state, it is difficult for the front side seat 42 to swing in the vehicle longitudinal direction, and therefore, the passenger PA who is seated at the front end side of the inwardly facing seat 22 feeling unpleasant can be suppressed.

In addition, at the fixing structure 40, the supporting member 52 rotatably supports the region, which is further toward the vehicle rear side than the vehicle longitudinal direction center, of the seat cushion 46. Due thereto, the front side seat 42 that is in the stored-away state can be set close to the inwardly-facing seat 22, as compared with a structure in which the vehicle longitudinal direction center of the seat cushion 46 is supported. Therefore, wasted space being formed between the inwardly-facing seat 22 and the front side seat 42 can be prevented.

When the passenger PB who is in the wheelchair 30 is to exit the bus 10, the hook portions 116 are taken-off of the projecting pins 33 (see FIG. 8), and the rear wheels 36 are withdrawn toward the vehicle front side from the groove portion 65 and the groove portion 66 (see FIG. 5). Due thereto, the wheelchair 30 and the passenger PB can exit the bus 10.

Next, in a case in which the state of the front side seat 42 is set to be the unfolded state, due to the operation portion 106 (see FIG. 7) of the locking portion 55 being moved to the vehicle transverse direction outer side, the main body portion 109A comes-out of the through-hole 57B (see FIG. 7). Due thereto, the seat cushion 46 and the seatback 48 become able to rotate. Then, the seat cushion 46 and the seatback 48 are rotated (pivoted) toward the vehicle front side around the supporting shaft 86 (see FIG. 4). At this time, due to the operation portion 69 (see FIG. 5) being operated, the contacting member 64 (see FIG. 5) is made to project-out to the outer side from the interior of the cavity portion 62 (see FIG. 5), and contacts the floor portion 14.

In the state in which the seat cushion 46 runs along the vehicle longitudinal direction and the vehicle transverse direction, due to the main body portion 109A (see FIG. 7) being inserted-through the through-hole 57B (see FIG. 7), the seat cushion 46 is locked (held). Then, due to the seatback 48 being rotated (pivoted) toward the vehicle upper side around the connecting rod 94 (see FIG. 4), the state of the front side seat 42 is set in the unfolded state. In this unfolded state, another passenger PA can seat in the front side seat 42.

Note that the present disclosure is not limited to the above-described embodiment.

Modified Example

Figure 11:
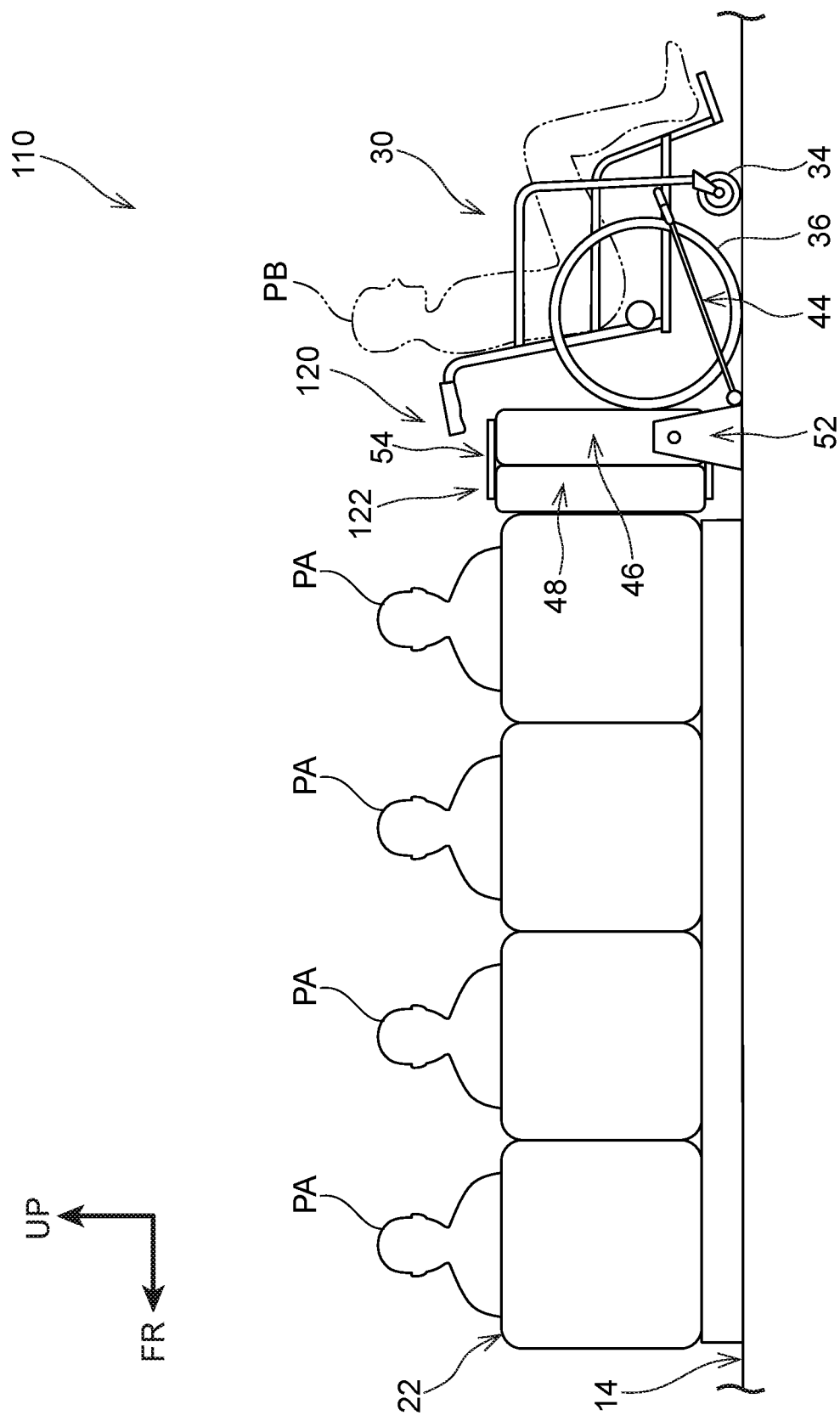
FIG. 11 is a side view showing a state in which a back side seat of a bus relating to a modified example of the present embodiment has been rotated, and a wheelchair has been placed.

A bus 110 that serves as an example of a vehicle is shown in FIG. 11. The bus 110 has the inwardly-facing seat 22, and a fixing structure 120 for fixing the wheelchair 30. Further, the bus 110 is a structure in which, in the previously-described bus 10 (see FIG. 1), the inwardly-facing seat 22 is set near to the entrance 13 side, and the wheelchair boarding space K is set at the rear side in the vehicle longitudinal direction with respect to the inwardly-facing seat 22 (is set further toward the front side than the exit 15). Note that, in the bus 110, structures other than the inwardly-facing seat 22 and the wheelchair boarding space K are similar to those of the bus 10.

The fixing structure 120 has a rear side seat 122, which serves as an example of the movable seat, and the fixing members 44. The rear side seat 122 is structured by the same types of members as those of the front side seat 42 (see FIG. 2), but differs with respect to the point that the respective members are structured so as to be symmetrical to those of the front side seat 42 across the inwardly-facing seat 22. Namely, the rear side seat 122 is disposed at the floor portion 14 at the rear side in the vehicle longitudinal direction with respect to the inwardly-facing seat 22. Further, the seat cushion 46 and the seatback 48 that are folded-up are rotated toward the inwardly-facing seat 22 side (the vehicle front side) and are set in the stored-away state. The fixing members 44 are stretched toward the vehicle rear side from regions adjacent to the supporting member 52 of the floor portion 14.

The rear wheels 36 of the wheelchair 30 are made to contact, from the vehicle rear side toward the vehicle front side, the rear side seat 122 that is in the stored-away state. Then, the wheelchair 30 is fixed to the floor portion 14 by the fixing members 44. The passenger PB who is seated in the wheelchair 30 is in a state of facing toward the vehicle rear side. In this way, even in a case in which the wheelchair 30 is fixed to the floor portion 14 at the vehicle longitudinal direction rear side of the inwardly-facing seat 22, the passenger PB in the wheelchair 30 can be boarded while the passengers PA who are seated in the inwardly-facing seat 22 are taken into consideration.

Other Modified Example

The bus 10 and the bus 110 are not limited to structures in which the exit 15 is formed at the vehicle rear side, and may be vehicles in which an exit is formed at the vehicle longitudinal direction central portion of the left side wall 26. Further, this exit at the central portion may be used also as the entrance. At the bus 10 and the bus 110, the entrance 13 may be used also as the exit.

In a case in which the inwardly-facing seat 22 is disposed at the right side wall 28 side, the fixing structure 40 and the fixing structure 120 may be provided at the right side wall 28 side. Further, there may be structures in which the fixing structure 40 and the fixing structure 120 are provided at the left side wall 26 so as to not get in the way of the rotation of the seatback 48 and the seat cushion 46, and the connecting member 54 is eliminated, and only the seat cushion 46 is rotated while being supported by the supporting member 52. Moreover, the seatback 48 may be eliminated, and the passenger PA may use the left side wall 26 as a seatback.

The cavity portion 62 and the contacting member 64 do not have to be provided at the seat cushion 46 of the fixing structure 40 and the fixing structure 120. For example, in a case in which the vehicle longitudinal direction central portion of the seat cushion 46 is supported by a supporting shaft having a large diameter, supporting of the seat cushion 46 is possible even if the contacting member 64 is not provided. Further, in this structure, the supported state can be maintained due to the seat cushion 46 being locked (rotation of the seat cushion 46 being restricted) by the locking portion 55.

The fixing member 44 is not limited to a structure having the belt portion 112, the mounting portion 114 and the hook portion 116. For example, the fixing member 44 may be a structure m which the belt portion 112 is made to be a rod member, the mounting portion 114 is structured by a hinge portion, and the hook portion 116 is provided at one end portion of the rod member. In this structure, due to the hinge portion being rotated, the hook portion 116 becomes able to move, and the hook portion 116 is made to catch on the projecting pin 33. The number of the fixing members 44 is not limited to two, and may be one or a plural number of three or more.

The number of the supporting members 52 may be either single or plural. Further, the region at which the supporting member 52 supports the seat cushion 46 is not limited to the region at the vehicle longitudinal direction rear side of the seat cushion 46, and may be a region in a vicinity of the center in a case in which there is leeway with respect to the wheelchair boarding space K in which the wheelchair 30 is placed.

The number of the connecting members 54 may be either single or plural. Further, the connecting member 54 is not limited to a structure in which the connecting rod 94 that serves as the center of rotation is provided at the seatback 48, and may be a structure in which a hinge portion that is the center of rotation is disposed between the seat cushion 46 and the seatback 48. Or, there may be a structure in which the connecting rod 94 that is the center of rotation is provided at the seat cushion 46.

The contacting member 64 is not limited to a structure that is accommodated in the cavity portion 62. Namely, if the contacting member 64 does not get in the way of placement of the wheelchair 30, there may be a structure in which the cavity portion 62 is not provided at the seat cushion 46, and the front side seat 42 is set in the stored-away state with the contacting member 64 projecting-out from the seat cushion 46 as is. Further, the contacting member 64, which projects-out from the seat cushion 46 as is, may be used as a restricting member that restricts movement of the rear wheels 36 in the vehicle vertical direction. Moreover, the number of the contacting members 64 is not limited to one, and may be plural. In addition, the shape of the contacting member 64 is not limited to the shape of a plate that has a flat surface, and may be a shape having a curved surface.

The groove portion 65 and the groove portion 66 do not have to be formed in the bottom wall 59 of the seat cushion 46. Further, the groove portions are not limited to structures that are sunken-in from the bottom wall 59 toward the inner side of the seat cushion 46, and may be regions that are formed by being projected-out from the bottom wall 59 toward the outer side of the seat cushion 46.

The inwardly-facing seat 22 is not limited to being sectioned into four seats, and may be sectioned into two, three, or five or more seats. Further, the inwardly-facing seat 22 may be made to be a long seat that is not sectioned in the vehicle longitudinal direction.

The from side seat 42 or the rear side seat 122 that is in the stored-away state may be used as an armrest member for the passengers PA who are seated in the inwardly-facing seat 22.

The size of the wheelchair boarding space K is not limited to a size that corresponds to approximately three segments of the inwardly-facing seat 22, and may be set to a size that is different than three segments.

The respective length direction lengths of the groove portion 65 and the groove portion 66 are not limited to (L2)/3, and may be another length.

As a restraining member that restrains the passenger PB of the wheelchair 30, for example, an outer belt having a tongue may be provided at the vehicle inner side of the left side wall 26, and a restraining member, which keeps the tongue in a buckle portion that is provided next to the seat cushion 46, may be used.

What is claimed is:

1. A vehicle comprising:
a fixed seat that is fixed to a floor portion such that seated passengers face in a vehicle transverse direction;
a movable seat having a seat cushion on which a passenger sits, a seatback that supports the passenger from a back surface side, a connecting member that connects the seat cushion and the seatback such that the seatback can rotate with respect to the seat cushion with a vehicle longitudinal direction being a rotational axis direction, and a supporting member that supports the seat cushion such that the seat cushion can rotate with respect to the floor portion with a vehicle transverse direction being a rotational axis direction toward the fixed seat, the movable seat being disposed at the floor portion at at least one of the vehicle longitudinal direction front side or rear side with respect to the fixed seat, and wheels of a wheelchair being able to contact the seat cushion in a vehicle longitudinal direction; and
a fixing member that fixes the wheelchair to the floor portion in a state in which the wheels are made to contact the movable seat.

2. The vehicle of claim 1, wherein:
the movable seat is disposed at the vehicle longitudinal direction front side with respect to the fixed seat, and the wheels are made to contact the movable seat from a vehicle front side.

3. The vehicle of claim 1, wherein a cavity portion, and a contacting member, which can be accommodated in the cavity portion and is made to contact the floor portion in a state of being projected out from the cavity portion toward an outer side, are provided at the seat cushion.

4. The vehicle of claim 1, wherein groove portions, in and from which the wheels can be inserted and withdrawn in the vehicle longitudinal direction, are formed in the seat cushion.

5. A vehicle comprising:
a fixed seat that is fixed to a floor portion such that seated passengers face in a vehicle transverse direction;
a movable seat having a seat cushion on which a passenger sits, and a supporting member that supports the seat cushion such that the seat cushion can rotate toward the fixed seat, the movable seat being disposed at the floor portion at at least one of a vehicle longitudinal direction front side or rear side with respect to the fixed seat, and wheels of a wheelchair being able to contact the seat cushion in a vehicle longitudinal direction; and
a fixing member that fixes the wheelchair to the floor portion in a state in which the wheels are made to contact the movable seat,
wherein a cavity portion, and a contacting member, which can be accommodated in the cavity portion and is made to contact the floor portion in a state of being projected out from the cavity portion toward an outer side, are provided at the seat cushion.

6. The vehicle of claim 5, wherein:
the movable seat is disposed at the vehicle longitudinal direction front side with respect to the fixed seat, and the wheels are made to contact the movable seat from a vehicle front side.

7. The vehicle of claim 5, wherein groove portions, in and from which the wheels can be inserted and withdrawn in the vehicle longitudinal direction, are formed in the seat cushion.

8. A vehicle comprising:
a fixed seat that is fixed to a floor portion such that seated passengers face in a vehicle transverse direction;
a movable seat having a seat cushion on which a passenger sits, and a supporting member that supports the seat cushion such that the seat cushion can rotate toward the fixed seat, the movable seat being disposed at the floor portion at at least one of a vehicle longitudinal direction front side or rear side with respect to the fixed seat, and wheels of a wheelchair being able to contact the seat cushion in a vehicle longitudinal direction; and
a fixing member that fixes the wheelchair to the floor portion in a state in which the wheels are made to contact the movable seat,
wherein groove portions, in and from which the wheels can be inserted and withdrawn in the vehicle longitudinal direction, are formed in the seat cushion.

* * * * *